(12) United States Patent
Matsumoto et al.

(10) Patent No.: US 12,111,108 B2
(45) Date of Patent: Oct. 8, 2024

(54) TRANSPORT ROLLER FOR HEATING FURNACES

(71) Applicant: Noritake Co., Limited, Nagoya (JP)

(72) Inventors: Kiyoshi Matsumoto, Nagoya (JP);
Takanori Uehara, Nagoya (JP);
Hidetaka Kato, Nagoya (JP);
Masaharu Ohashi, Nagoya (JP)

(73) Assignee: Noritake Co., Limited, Nagoya (JP)

( * ) Notice: Subject to any disclaimer, the term of this patent is extended or adjusted under 35 U.S.C. 154(b) by 0 days.

(21) Appl. No.: 17/659,261

(22) Filed: Apr. 14, 2022

(65) Prior Publication Data

US 2022/0333864 A1 Oct. 20, 2022

(30) Foreign Application Priority Data

Apr. 19, 2021 (JP) ................................. 2021-070435

(51) Int. Cl.
*F27D 3/02* (2006.01)
*B65G 39/02* (2006.01)
*F27B 9/24* (2006.01)

(52) U.S. Cl.
CPC ............ *F27D 3/026* (2013.01); *B65G 39/02* (2013.01); *F27B 9/2407* (2013.01)

(58) Field of Classification Search
CPC ....... F27D 3/026; C03B 35/185; F27B 9/2407
See application file for complete search history.

(56) References Cited

U.S. PATENT DOCUMENTS

| | | | |
|---|---|---|---|
| 6,638,472 B2 | 10/2003 | Lemke | |
| 2002/0079624 A1* | 6/2002 | Lemke | F27D 3/026 266/176 |
| 2004/0178043 A1* | 9/2004 | Brinkmeier | B22D 11/1287 193/37 |
| 2019/0241477 A1* | 8/2019 | Dorst | C04B 41/87 |
| 2021/0310737 A1* | 10/2021 | Kintscher | C03B 35/189 |

FOREIGN PATENT DOCUMENTS

| | | | | |
|---|---|---|---|---|
| CN | 104379519 A | * | 2/2015 | ............ C03B 25/08 |
| JP | S62288483 A | | 12/1987 | |
| JP | 2000111265 A | | 4/2000 | |
| JP | 2002172452 A | | 6/2002 | |

(Continued)

OTHER PUBLICATIONS

WO2011118534A1—machine translation (Year: 2011).*

(Continued)

*Primary Examiner* — Steven S Anderson, II
(74) *Attorney, Agent, or Firm* — Gerald W. Roberts; John V. Daniluck; Dentons Bingham Greenebaum LLP

(57) ABSTRACT

The transport roller disclosed herein includes: an outer tubular member which is tubular and is made of a metal material; an inner tubular member which is provided inside the outer tubular member, is tubular, and is made of a ceramic material; multiple ring-shaped projections which each have a ring shape along an outer peripheral surface of the outer tubular member, are made of a metal material, and are supporting the heating target; and protection members which are formed in respective portions of the ring-shaped projections in contact with the heating target, and each include a ceramic coating containing a ceramic component.

21 Claims, 4 Drawing Sheets

(56) References Cited

FOREIGN PATENT DOCUMENTS

| | | | |
|---|---|---|---|
| JP | 2015083845 A | 4/2015 | |
| JP | 2015127617 A | 7/2015 | |
| WO | WO-0234026 A1 * | 5/2002 | ............ F27B 9/2407 |
| WO | 2009060868 A1 | 5/2009 | |
| WO | 2011118534 A1 | 9/2011 | |
| WO | 2019193895 A1 | 10/2019 | |

OTHER PUBLICATIONS

Tanaka, CN-104379519-A and translation (Year: 2015).*
European Patent Office, Extended EP Search Report for Application No. EP22168195.0, Aug. 23, 2022, 8 pages.

* cited by examiner

TRANSPORT ROLLER FOR HEATING FURNACES

CROSS-REFERENCE TO RELATED APPLICATION(S)

The present application claims the benefit of priority of Japanese patent application No. 2021-070435, filed Apr. 19, 2021, the entire disclosure of which is incorporated herein in its entirety by reference.

FIELD OF THE INVENTION

The present teaching relates to a transport roller for heating furnaces.

BACKGROUND OF THE INVENTION

Transport rollers have been used to transport a heating target heated in a heating furnace where the heating target is heated for heat treatment. When the heating target is heated, the temperature in the heating furnace reaches a relatively high temperature (e.g., about 500° C. to about 1000° C.). Thus, the transport rollers placed in the heating furnace are suitably made of a material having excellent shock resistance and excellent thermal deformation resistance. For example, Japanese Patent Application Publication No. 2015-127617 discloses a transport roller where an outer tubular member made of a material having a relatively high shock resistance and an inner tubular member made of a relatively high thermal deformation resistance are integral with each other via an intermediate member made of a heat-resistant insulation material. WO 2019/193895 discloses a transport roller including a roller body including a metal tube which is made of a heat-resistant alloy and support protrusions formed on the outer peripheral surface of the roller body and made of a heat-resistant alloy.

When the heated heating target is transported by the transport roller made of a metal material, the transport roller and the heating target may react with each other, depending on the material of the heating target, which may cause failures in the transport roller (e.g., a reduction in durability).

SUMMARY

An object of the present teaching is to provide a transport roller for a heating furnace, which reduces a reaction with a heating target heated in the heating furnace and has an excellent durability.

An aspect of the transport roller for a heating furnace disclosed herein is placed in a heating furnace, supports a heating target heated in the heating furnace, and transports the heating target. The transport roller is tubular, and includes an outer tubular member made of a metal material an inner tubular member that is provided inside the outer tubular member, is tubular, and is made of a ceramic material; multiple ring-shaped projections that each have a ring shape along an outer peripheral surface of the outer tubular member, are made of a metal material, and are supporting the heating target; and protection members that are formed in respective portions of the ring-shaped projections in contact with the heating target, and each include a ceramic coating containing a ceramic component.

In the transport roller, the inner tubular member is made of a ceramic material having excellent thermal deformation resistance. Thus, durability of the transport roller is kept even when the temperature in the heating furnace is increased. The ceramic material has a high reactivity with metals (e.g., aluminum). Thus, if the heating target contains a metal material, the contact between the heating target and the inner tubular member may cause deterioration of the inner tubular member. However, the inner tubular member is provided inside the outer tubular member made of a metal material. Thus, the inner tubular member does not come direct contact with the heating target. Further, multiple ring-shaped projections each having a ring shape support the heating target along the outer peripheral surface of the outer tubular member. Thus, it is possible to substantially prevent direct contact between the heating target and the outer tubular member. In other words, the heating target can be transported with a largely reduced contact area between the heating target and the transport roller. Further, the protection members each including a ceramic coating are provided in respective portions of the ring-shaped projections in contact with the heating target. The ceramic coating has excellent heat resistance and thus can support the heating target heated at high temperatures. In addition, metal does not easily adhere to the ceramic coating. Thus, for example, if the metal in the heating target melts, the metal is less prone to adhere to the ring-shaped projections, and even if the metal adheres to the ring-shaped projections, the metal can be easily removed. This achieves excellent maintainability.

According to a preferred aspect of the transport roller, the ceramic coating is a ceramic spray coating. The ceramic spray coating formed by thermal spraying has excellent heat resistance and excellent corrosion resistance, whereby the ring-shaped projections can be effectively protected. Accordingly, durability of the ring-shaped projections is improved.

According to a preferred aspect of the transport roller, the ceramic component is zirconia. This allows effective protection of the ring-shaped projections. Accordingly, durability of the ring-shaped projections is improved.

According to a preferred aspect of the transport roller, outer peripheral surfaces of the ring-shaped projections are rounded. This allows a reduction in contact area between the ring-shaped projections and the heating target, whereby the reaction between the heating target and the transport roller can be further reduced.

According to a preferred aspect of the transport roller, the heating target is a surface-treated steel plate containing an aluminum component. When the steel plate which has been surface-treated with an aluminum component is exposed to high temperature in the heating furnace, the aluminum component may melt. Aluminum has high reactivity with the inner tubular member made of a ceramic material. However, the inner tubular member is provided inside the outer tubular member, and thus does not come direct contact with the heating target. This allows the inner tubular member to be substantially prevented from deteriorating.

A heating system disclosed herein includes a heating furnace for heating a heating target, and multiple transport rollers for the heating furnace. The transport rollers are arranged in parallel in the heating furnace in a transport direction of the heating target. Assuming that transport rollers adjacent to each other in the transport direction are a first transport roller and a second transport roller, the ring-shaped projection of the first transport roller and the ring-shaped projection of the second transport roller are offset from each other in a longitudinal direction of the transport rollers. With this configuration, the spacing between the transport rollers arranged in parallel in the transport direction can be reduced. Thus, more transport rollers can be placed in the heating furnace, or the length of the heating furnace in the transport direction can be reduced.

DETAILED DESCRIPTION OF THE PREFERRED EMBODIMENT(S)

Figure 1:
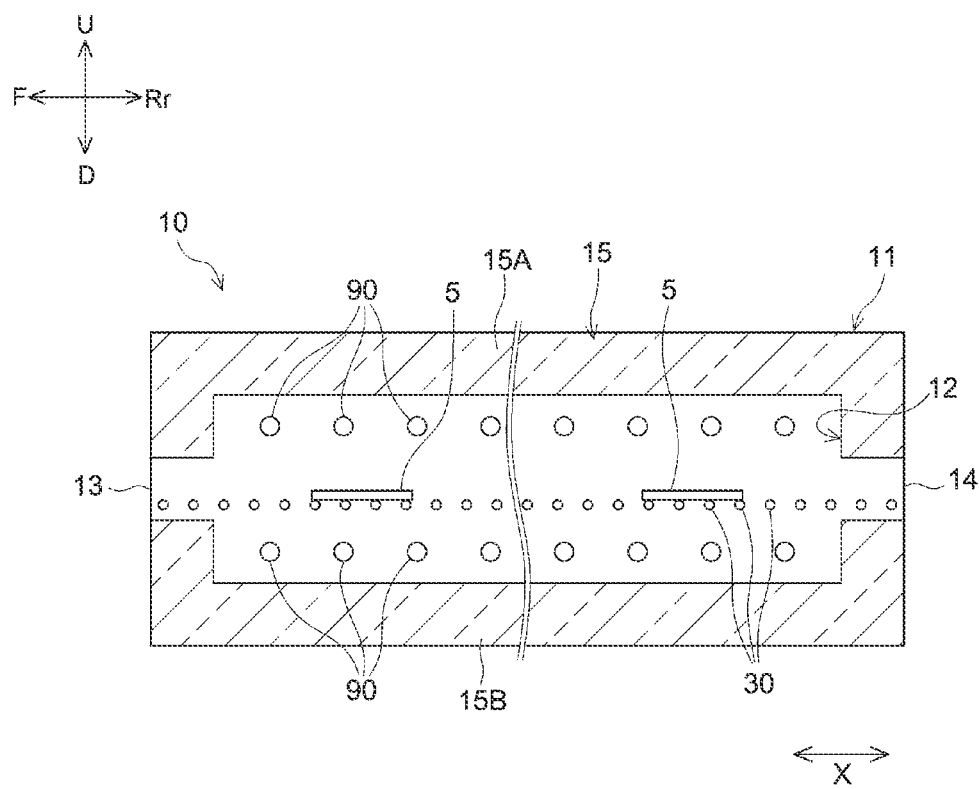
FIG. 1 is a longitudinal sectional view schematically illustrating a continuous firing furnace according to an embodiment.

The following describes one of typical embodiments in the present disclosure in detail below with reference to drawings. In the drawings, the same members/portions which exhibit the same action are denoted by the same reference numeral. The dimensional relation (such as length, width, or thickness) in each drawing does not reflect the actual dimensional relation. The directions of up, down, left, right, front, and rear are indicated by arrows U, D, L, R, F, and Rr, respectively. Here, up, down, left, right, front, and rear are defined merely for convenience of explanation, and do not limit the present disclosure unless otherwise mentioned.

Figure 2:
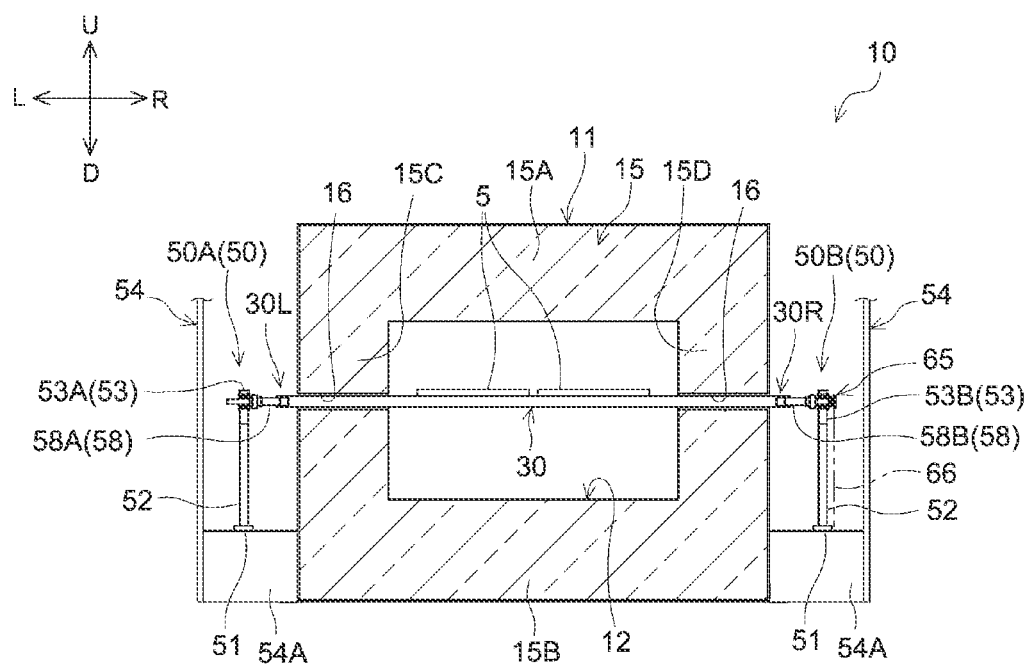
FIG. 2 is a transverse sectional view schematically illustrating the continuous firing furnace according to the embodiment.

FIG. 1 is a longitudinal sectional view schematically illustrating a continuous firing furnace 10. FIG. 2 is a transverse sectional view schematically illustrating the continuous firing furnace 10. The continuous firing furnace 10 is an example of the heating furnace. The continuous firing furnace 10 heats a heating target 5. The continuous firing furnace 10 is a so-called roller hearth kiln. As shown in FIGS. 1 and 2, the continuous firing furnace 10 includes a furnace body 11, multiple transport rollers 30, a support mechanism 50 supporting the transport rollers 30, and heaters 90.

The heating target 5 is, for example, a steel plate. The steel plate is formed, for example, by subjecting a high tensile steel plate to a punching process by pressing. The steel plate is surface-treated to contain an aluminum component, for example. On the steel plate, a coating (AlSi coating) containing an aluminum component and a silicon component is formed, for example. The steel plate can be, for example, Usibor (registered trademark) manufactured by Arcelor Mittal. The heating target 5 is placed on the transport rollers 30.

As shown in FIG. 1, the furnace body 11 has a tunnel shape, and has therein a transport space 12 to which the heating target 5 is transported. An inlet 13 which is communicating with the transport space 12 and is for allowing the heating target 5 to be transported therethrough is provided at one end (here, a front end) of the furnace body 11. An outlet 14 which is communicating with the transport space 12 and is for allowing the heating target 5 to be discharged therethrough is provided at the other end (here, a back end) of the furnace body 11. The heating target 5 is transported from the inlet 13 toward the outlet 14 through the transport space 12. The direction in which the heating target 5 is transported is a transport direction X, and coincides with the longitudinal direction (here, the front-back direction) of the furnace body 11.

As shown in FIG. 2, the furnace body 11 has a furnace wall 15 surrounding the transport space 12. The furnace wall 15 is made of a heat insulation material. The furnace wall 15 may be made of layers of ceramic fiber board formed into a predetermined shape. The ceramic fiber board is, for example, a board material made by adding an inorganic filler and an inorganic/organic binder to so-called bulk fibers and forming it into a board shape. The furnace wall 15 includes an upper wall 15A located above the transport space 12, a lower wall 15B located below the transport space 12, a first side wall 15C provided on one side (here, the left side) of the transport space 12 in the width direction, and a second side wall 15D provided on the other side (here, the right side) of the transport space 12. The first side wall 15C and the second side wall 15D each have a through hole 16 for allowing the transport rollers 30 to be inserted therethrough. The through hole 16 has an inner diameter slightly larger than the outer diameter of the transport rollers 30. The transport rollers 30 are bridged between the first side wall 15C and the second side wall 15D. The thickness of the furnace wall 15 is set to the required thickness so that the heat of the transport space 12 is sufficiently insulated.

As shown in FIG. 1, multiple heaters 90 are placed in the transport space 12 of the furnace body 11. The heaters 90 are members for heating the heating target 5 in the transport space 12. The multiple heaters 90 are arranged at predetermined intervals in an upper and lower portions of the transport space 12 along the transport direction X. Multiple transport rollers 30 are arranged between the upper heaters 90 and the lower heaters 90. In the present embodiment, the heaters 90 are cylindrical and penetrate the first side wall 15C and the second side wall 15D. Various types of heaters can be used as the heaters 90 according to the heating temperature and the like, and ceramic heaters can be used, for example. In FIG. 2, the heaters 90 are not shown.

Figure 6:
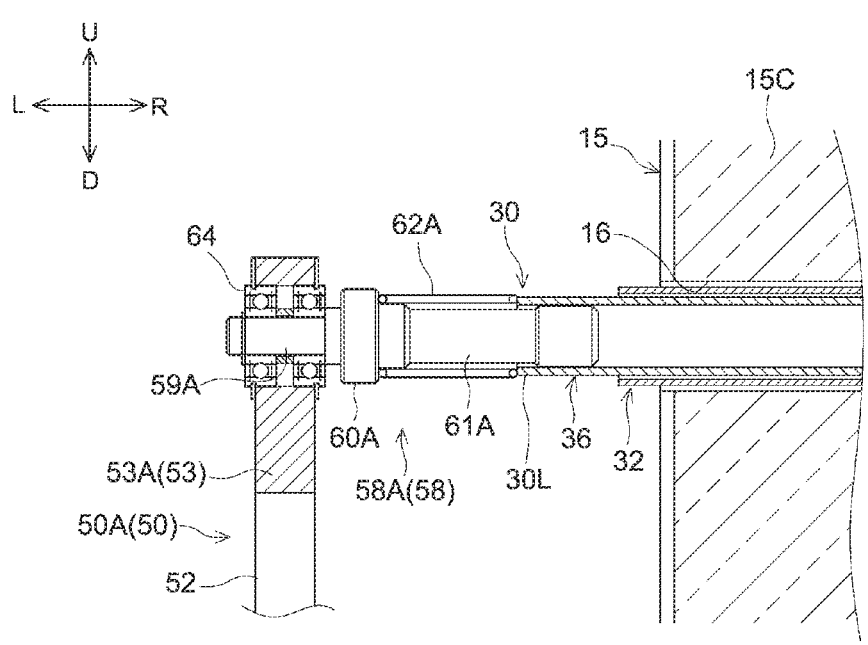
FIG. 6 is an enlarged view of a first support member supporting a transport roller according to an embodiment.
Figure 7:
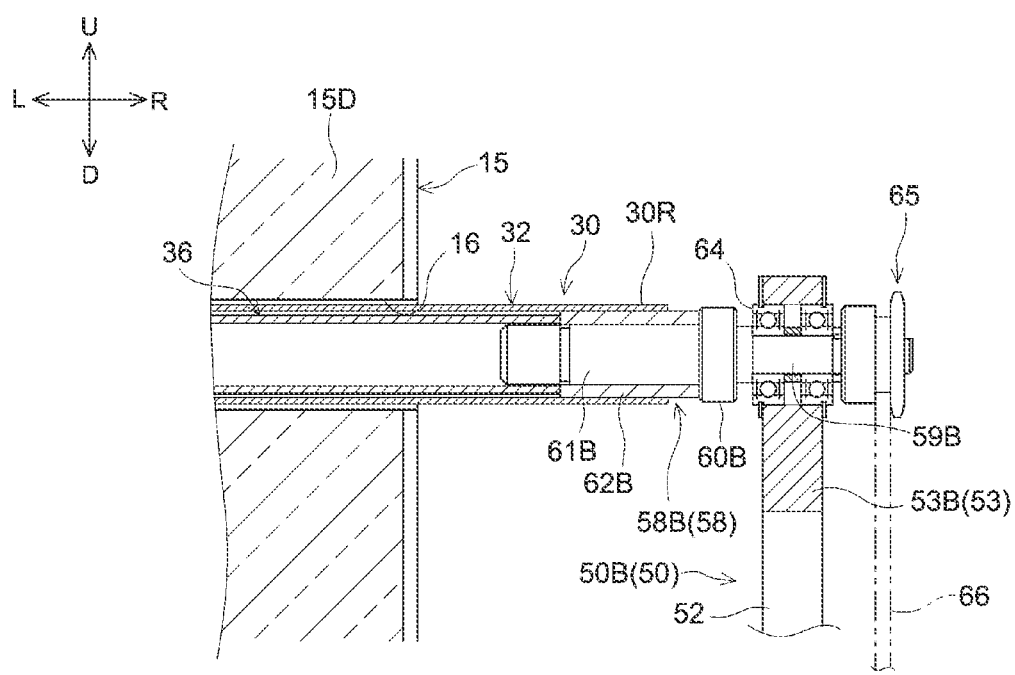
FIG. 7 is an enlarged view of a second support member supporting a transport roller according to the embodiment.

As shown in FIG. 1, the transport rollers 30 are placed in the furnace body 11 of the continuous firing furnace 10. Each of the transport rollers 30 is an example of a transport roller for a heating furnace. The transport rollers 30 support the heating target 5 heated in the continuous firing furnace 10. The transport rollers 30 transport the heating target 5. As shown in FIG. 6, each transport roller 30 includes an outer tubular member 32, an inner tubular member 36 provided inside the outer tubular member 32, multiple ring-shaped projections 40 (see FIG. 3) provided along the outer peripheral surface of the outer tubular member 32, and protection members 45 (see FIG. 3) formed on the respective ring-shaped projections 40. The transport rollers 30 each have a double structure. The outer tubular member 32 is tubular. The outer tubular member 32 is made of a metal material. Examples of the metal material include stainless steel (e.g., SUS310S) and chromium molybdenum steel, having heat resistance and corrosion resistance. The inner tubular member 36 is tubular. The inner tubular member 36 is made of a ceramic material. Examples of the ceramic material include silicon carbide, mullite, and alumina. The outer diameter of the inner tubular member 36 is smaller than the inner diameter of the outer tubular member 32. The inner tubular member 36 and the outer tubular member 32 are spaced apart from each other, and an air layer is formed between the inner tubular member 36 and the outer tubular member 32. The lengths of the outer tubular member 32 and the inner tubular member 36 in the longitudinal direction (here, the left-right direction) are set to the lengths penetrating the first side wall 15C and the second side wall 15D and projecting outside the furnace body 11. The left end of the inner tubular member 36 is located to the left of the left end of the outer tubular member 32. In other words, the left end of the inner tubular member 36 projects from the outer tubular member 32. As shown in FIG. 7, the right end of the inner tubular member 36 is located to the right of the right end of the outer tubular member 32. In other words, the right end of the inner tubular member 36 is located inside the outer tubular member 32. At least in the transport space 12, the inner tubular member 36 is located inside the outer tubular member 32.

Figure 3:
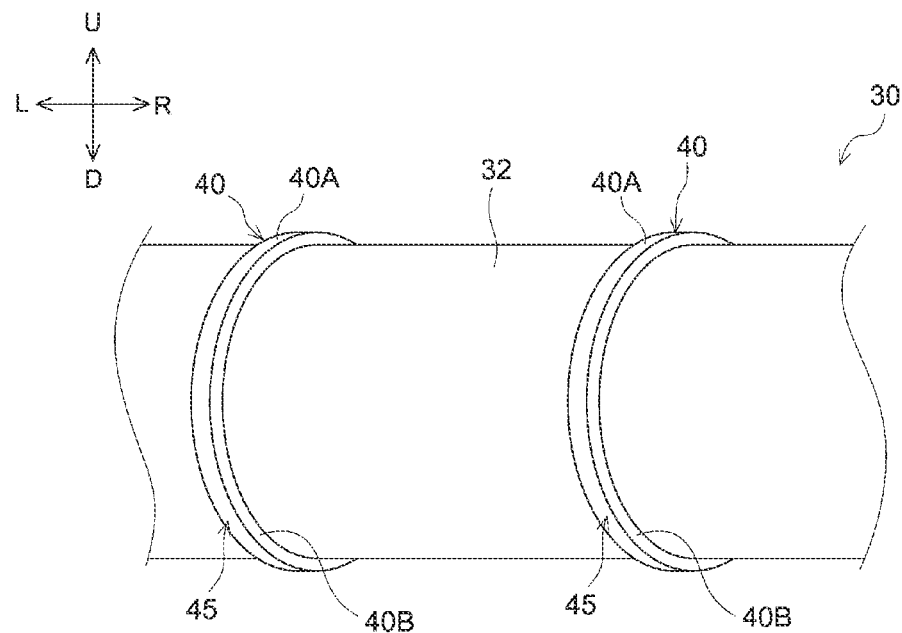
FIG. 3 is an enlarged perspective view of a portion of a transport roller according to the embodiment.

As shown in FIG. 3, ring-shaped projections 40 each have a ring shape along the outer peripheral surface of the outer tubular member 32. The ring-shaped projections 40 are made of a metal material. Examples of the metal material include stainless steel (e.g., SUS310S) and chromium molybdenum steel, having heat resistance and corrosion resistance. The ring-shaped projections 40 support the heating target 5 (see FIG. 1). The outer peripheral surfaces 40A of the ring-shaped projections 40 support the heating target 5. The outer peripheral surfaces 40A of the ring-shaped projections 40 are rounded. In other words, portions of the outer peripheral surfaces 40A of the ring-shaped projections 40 in contact with the heating target 5 each have a curved surface. The side surfaces 40B of the ring-shaped projections 40 do not come into contact with the heating target 5. One outer tubular member 32 is provided with multiple ring-shaped projections 40. The ring-shaped projections 40 are arranged to be spaced apart from each other at predetermined intervals in the left-right direction. The ring-shaped projections 40 are fixed to the outer tubular member 32 by welding, for example.

Figure 4:
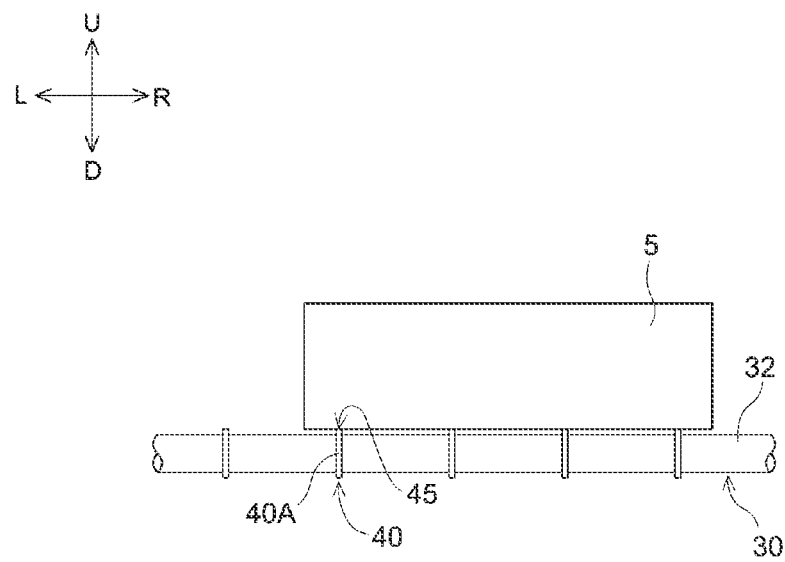
FIG. 4 is a front view illustrating a state where a heating target is supported by a transport roller according to the embodiment.

As shown in FIG. 3, the protection members 45 are formed in respective portions of the ring-shaped projections 40 at least in contact with the heating target 5. In the present embodiment, the protection members 45 are formed on the respective outer peripheral surfaces 40A of the ring-shaped projections 40. The protection members 45 may be formed on the respective side surfaces 40B of the ring-shaped projections 40, but are not formed at least on portions of the side surfaces 40B of the ring-shaped projections 40 in contact with the outer tubular member 32. As shown in FIG. 4, the outer peripheral surfaces 40A of the ring-shaped projections 40 indirectly support the heating target 5 via the protection members 45. The protection members 45 each include a ceramic coating containing a ceramic component. The ceramic component may be, for example, a ceramic (oxide-based ceramic) material including oxides of various metals, or a ceramic material including nonoxide such as carbide, boride, nitride, and apatite.

More specific examples of the oxide-based ceramic include alumina, zirconia, yttria, chromia, titania, cobaltite, magnesia, silica, calcia, ceria, ferrite, spinel, zircon, nickel oxide, silver oxide, copper oxide, zinc oxide, gallium oxide, strontium oxide, scandium oxide, samarium oxide, bismuth oxide, lanthanum oxide, lutetium oxide, hafnium oxide, vanadium oxide, niobium oxide, tungsten oxide, manganese oxide, tantalum oxide, terbium oxide, europium oxide, neodymium oxide, tin oxide, antimony oxide, antimony-containing tin oxide, indium oxide, tin-containing indium oxide, zirconium oxide aluminate, zirconium oxide silicate, hafnium oxide aluminate, hafnium oxide silicate, titanium oxide silicate, lanthanum oxide silicate, lanthanum oxide aluminate, yttrium oxide silicate, titanium oxide silicate, and tantalum oxide silicate. The ceramic component in the protection members 45 can be, for example, suitably zirconia.

Examples of the nonoxide-based ceramic include: carbides such as tungsten carbide (WC), chromium carbide, vanadium carbide, niobium carbide, molybdenum carbide, tantalum carbide, titanium carbide, zirconium carbide, hafnium carbide, silicon carbide, and boron carbide; borides such as tungsten boride (WB), molybdenum boride, chromium boride, hafnium boride, zirconium boride, tantalum boride, and titanium boride; nitrides such as boron nitride, titanium nitride, silicon nitride, and aluminum nitride; composite materials such as forsterite, steatite, cordierite, mullite, barium titanate, lead titanate, lead zirconate titanate, Mn—Zn ferrite, Ni—Zn ferrite, and sialon; and phosphate compounds such as hydroxyapatite and calcium phosphate.

The ceramic coating is, for example, a ceramic spray coating formed by thermal spraying. How to perform the thermal spraying is not particularly limited, and can be, for example, suitably any of plasma spraying such as atmospheric plasma spraying (APS), low pressure plasma spraying (LPS), and high pressure plasma spraying; and high velocity flame spraying such as high velocity oxygen flame (HVOF) spraying, warm spraying, and high velocity air flame (HVAF) spraying. How to form the ceramic coating is not limited to thermal spraying, and may be, for example, chemical vapor deposition (CVD), physical vapor deposition (PVD), sputtering, spin coating, dipping, and spray coating.

Figure 5:
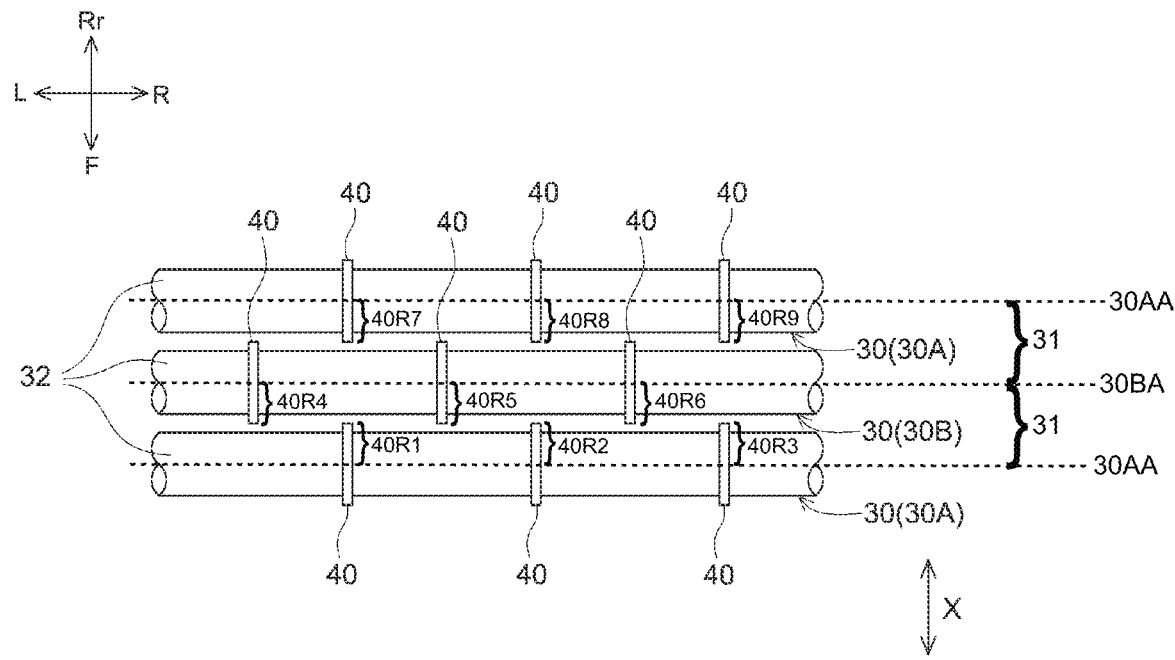
FIG. 5 is a plan view illustrating portions of multiple transport rollers placed in a continuous firing furnace according to the embodiment.

As shown in FIG. 5, the transport rollers 30 are arranged in parallel in the transport direction X of the heating target 5. Assuming that the transport rollers 30 adjacent to each other in the transport direction X are a first transport roller 30A and a second transport roller 30B, the ring-shaped projection 40 of the first transport roller 30A and the ring-shaped projection 40 of the second transport roller 30B are offset from each other in a longitudinal direction of the transport rollers 30 (here, the left-right direction). In other words, the transport rollers 30 are placed inside the continuous firing furnace 10 so that the ring-shaped projections 40 are arranged in a zigzag pattern. For example, a portion of the ring-shaped projection 40 of the first transport roller 30A may overlap with a portion of the ring-shaped projection 40 of the second transport roller 30B in the transport direction X. It should be appreciated, then, that the first transport roller 30A may extend about a first longitudinal axis 30AA, the second transport roller 30B may extend about a second longitudinal axis 30BA, the first longitudinal axis 30AA may be spaced apart from the second longitudinal axis 30BA by a distance 31, the ring-shaped metal projections 40 may have respective outer radiuses 40R1, 40R2, 40R3, 40R4, 40R5, 40R6, 40R7, 40R8, 40R9, the distance 31 may be less than a sum of the outer radius 40R1 with the outer radius 40R5 (such that |distance 31|<(40R1+40R5)), the distance 31 may be less than a sum of the outer radius 40R5 with the outer radius 40R2 (such that |distance 31|<(40R5+40R2)), and the distance 31 may be less than a sum of the outer radius 40R2 with the outer radius 40R6 (such that |distance 31|<(40R2+40R6)).

As shown in FIG. 2, a support mechanism 50 supporting the transport rollers 30 is provided outside of the width direction (here, the left-right direction) of the furnace body 11. A cover 54 is attached to the side of the furnace body 11 to keep the atmosphere inside the furnace body 11. The support mechanism 50 is housed inside the cover 54. The support mechanism 50 includes a base 51, supports 52, a supporting frame 53, and a support member 58. The base 51 is provided on the bottom 54A of the cover 54. The support 52 extends upward from the base 51. Multiple supports 52 are provided and arranged at predetermined intervals along the transport direction X. The support mechanism 50 includes a first support mechanism 50A supporting a first end 30L of the transport roller 30 and a second support mechanism 50B supporting a second end 30R of the transport roller 30. In the present embodiment, the first support mechanism 50A is a support mechanism on a driven side of the transport rollers 30, and the second support mechanism 50B is a support mechanism on a drive side of the transport rollers 30.

As shown in FIG. 2, the supporting frames 53 are provided at the upper ends of the supports 52. The supporting frames 53 include a first supporting frame 53A and a second supporting frame 53B. The first supporting frame 53A is arranged outside (here, on the left side) of the first side wall 15C of the furnace body 11. The first supporting frame 53A is provided with a bearing 64 (see FIG. 6). The second supporting frame 53B is arranged outside (here, on the right side) of the second side wall 15D of the furnace body 11. The second supporting frame 53B is provided with a bearing 64 (see FIG. 7).

As shown in FIG. 2, the support member 58 includes a first support member 58A and a second support member 58B. As shown in FIG. 6, the first support member 58A is rotatably supported by the first supporting frame 53A via a bearing 64. The first support member 58A supports a first end 30L of the transport roller 30 penetrating the first side wall 15C. As shown in FIG. 7, the second support member 58B is rotatably supported by the second supporting frame 53B via a bearing 64. The second support member 58B supports the second end 30R of the transport roller 30 penetrating the second side wall 15D.

As shown in FIG. 6, the first support member 58A includes a first support shaft 59A supported by a bearing 64, a spring seat 60A connected to the first support shaft 59A, a first insertion shaft 61A connected to the spring seat 60A, and a coil spring 62A provided around the first insertion shaft 61A. The first insertion shaft 61A is inserted into the inner tubular member 36. The coil spring 62A is engaged with the spring seat 60A and the end (here, the left end) of the inner tubular member 36, and biases the inner tubular member 36 to be apart from the spring seat 60A (toward the right side herein).

As shown in FIG. 7, the second support member 58B includes a second support shaft 59B supported by a bearing 64, a seat 60B connected to the second support shaft 59B, a second insertion shaft 61B connected to the seat 60B, and a connection member 62B provided around the second insertion shaft 61B. The second insertion shaft 61B is inserted into the inner tubular member 36. The connection member 62B is integral with the second insertion shaft 61B. The connection member 62B is in contact with an end (right end) of the inner tubular member 36. The connection member 62B is inserted into the outer tubular member 32. The connection member 62B is in connection with the outer tubular member 32. Thus, at least the outer tubular member 32 of the transport roller 30 is rotated with rotation of the second insertion shaft 61B. A sprocket 65 is provided at the right end of the second support shaft 59B. A roller chain 66 is wound around the sprocket 65, and the second support shaft 59B in connection to the sprocket 65 is rotated around the bearing 64 by driving of the drive mechanism (not shown). Accordingly, the transport roller 30 is rotated.

Although a specific embodiment of the present disclosure has been described in detail above, it is a mere example and does not limit the appended claims. In the disclosure herein, various modifications can be made, and each component and each process described herein can be omitted or combined as appropriate as long as no particular problem arises.

The above-mentioned transport roller 30 uses a continuous firing furnace 10, but is not limited thereto. The transport roller 30 may be used as a transport roller in a batch-type heating furnace, an intermittent transportation-type heating furnace, or walking beam-type heating furnace.

In the embodiment described above, the ring-shaped projections 40 are provided separately from the outer tubular member 32 and are fixed to the outer tubular member 32 by welding, but is not limited thereto. For example, the ring-shaped projections 40 may be formed directly on the outer peripheral surface of the outer tubular member 32 by buildup welding.

What is claimed is:

1. A heating system for heating a heating target, the heating system comprising:
    a heating furnace including a first side wall portion and a second side wall portion opposing the first side wall portion, the heating furnace having therein a transport space between the first side wall portion and the second side wall portion, the heating furnace configured to heat the heating target within the transport space such that an internal temperature within the transport space reaches between about 500° C. and about 1000° C. when the heating furnace heats the heating target therein; and
    a first transport roller disposed at least partly within the heating furnace and arranged to support and transport the heating target within the heating furnace, the first transport roller including
        a first metal outer tubular member spanning across the transport space from the first side wall portion of the heating furnace to the second side wall portion of the heating furnace,
        a first ceramic inner tubular member disposed at least partly within the first metal outer tubular member and free-spanning within the first metal outer tubular member across the transport space from the first side wall portion of the heating furnace to the second side wall portion of the heating furnace,
        a first air layer formed between the first ceramic inner tubular member and the first metal outer tubular member and spanning across the transport space from the first side wall portion of the heating furnace to the second side wall portion of the heating furnace, and
        a first plurality of ring-shaped metal projections, each ring-shaped metal projection of the first plurality of ring-shaped metal projections arranged to support the heating target and having a ring shape along an outer peripheral surface of the first metal outer tubular member.

2. The heating system according to claim 1, wherein the first transport roller includes a first plurality of protection members, each protection member of the first plurality of protection members being formed in a respective portion of a respective one of the ring-shaped metal projections of the first plurality of ring-shaped metal projections, having a ceramic coating containing a ceramic component, and arranged to contact the heating target.

3. The heating system according to claim 2, wherein the ceramic coating is a ceramic spray coating.

4. The heating system according to claim 2, wherein the ceramic component is zirconia.

5. The heating system according to claim 2, wherein outer peripheral surfaces of the ring-shaped metal projections are rounded.

6. The heating system according to claim 2, wherein the heating target is a surface-treated steel plate containing an aluminum component.

7. The heating system according to claim 2, comprising:
a second transport roller disposed at least partly within the heating furnace and arranged to support and transport the heating target within the heating furnace, the second transport roller including
 a second metal outer tubular member spanning across the transport space from the first side wall portion of the heating furnace to the second side wall portion of the heating furnace,
 a second ceramic inner tubular member disposed at least partly within the second metal outer tubular member and free-spanning within the first metal outer tubular member across the transport space from the first side wall portion of the heating furnace to the second side wall portion of the heating furnace,
 a second air layer formed between the second ceramic inner tubular member and the second metal outer tubular member and spanning across the transport space from the first side wall portion of the heating furnace to the second side wall portion of the heating furnace,
 a second plurality of ring-shaped metal projections, each ring-shaped metal projection of the second plurality of ring-shaped metal projections arranged to support the heating target and having a ring shape along an outer peripheral surface of the second metal outer tubular member, and
 a second plurality of protection members, each protection member of the second plurality of protection members formed in a respective portion of a respective one of the ring-shaped metal projections of the second plurality of ring-shaped metal projections, having a ceramic coating containing a ceramic component, and arranged to contact the heating target,
wherein the transport rollers are arranged adjacent to each other in parallel in the heating furnace in a transport direction of the heating target,
wherein the ring-shaped metal projections of the first transport roller and the ring-shaped metal projections of the second transport roller are offset from each other in a longitudinal direction of the transport rollers, and
wherein the first transport roller extends about a first longitudinal axis, the second transport roller extends about a second longitudinal axis, the first longitudinal axis is spaced apart from the second longitudinal axis by a first distance, the first plurality of ring-shaped metal projections includes a first ring-shaped metal projection having a first outer radius, the second plurality of ring-shaped metal projections includes a second ring-shaped metal projection having a second outer radius, the first plurality of ring-shaped metal projections includes a third ring-shaped metal projection having a third outer radius, the second plurality of ring-shaped metal projections includes a fourth ring-shaped metal projection having a fourth outer radius, the first distance is less than a sum of the first outer radius with the second outer radius, the first distance is less than a sum of the second outer radius with the third outer radius, and the first distance is less than a sum of the third outer radius with the fourth outer radius.

8. The heating system according to claim 7, wherein the first transport roller is configured to transport a metal material as the heating target.

9. The heating system according to claim 7, wherein the first transport roller is configured to transport a heating target that is surface-treated to contain an aluminum component.

10. The heating system according to claim 7, wherein at least one protection member of the first plurality of protection members is formed on a respective side surface of a respective one of the ring-shaped metal projections of the first plurality of ring-shaped metal projections but does not contact the first metal outer tubular member.

11. The heating system according to claim 10, wherein each protection member of the first plurality of protection members is formed on a respective side surface of a respective one of the ring-shaped metal projections of the first plurality of ring-shaped metal projections but does not contact the first metal outer tubular member.

12. A heating system for heating a heating target, the heating system comprising:
a heating furnace configured to heat the heating target therein such that an internal temperature within the heating furnace reaches between about 500° C. and about 1000° C. when the heating furnace heats the heating target therein; and
a plurality of transport rollers, each transport roller of the plurality of transport rollers disposed at least partly within the heating furnace and arranged to support and transport the heating target within the heating furnace, the plurality of transport rollers including a first transport roller and a second transport roller,
 the first transport roller including
  a first metal outer tubular member,
  a first ceramic inner tubular member disposed at least partly within the first metal outer tubular member, and
  a first plurality of ring-shaped metal projections, each ring-shaped metal projection of the first plurality of ring-shaped metal projections arranged to support the heating target and having a ring shape along an outer peripheral surface of the first metal outer tubular member,
 the second transport roller including
  a second metal outer tubular member,
  a second ceramic inner tubular member disposed at least partly within the second metal outer tubular member, and
  a second plurality of ring-shaped metal projections, each ring-shaped metal projection of the second plurality of ring-shaped metal projections arranged to support the heating target and having a ring shape along an outer peripheral surface of the second metal outer tubular member,
wherein the transport rollers are arranged adjacent to each other in the heating furnace in a transport direction of the heating target,
wherein the ring-shaped metal projections of the first transport roller and the ring-shaped metal projections of the second transport roller are offset from each other in a longitudinal direction of at least one of the transport rollers, and
wherein the first transport roller extends about a first longitudinal axis, the second transport roller extends about a second longitudinal axis, the first longitudinal axis is spaced apart from the second longitudinal axis by a first distance, the first plurality of ring-shaped metal projections includes a first ring-shaped metal projection having a first outer radius, the second plurality of ring-shaped metal projections includes a second ring-shaped metal projection having a second outer radius, the first plurality of ring-shaped metal projections includes a third ring-shaped metal projection having a third outer radius, the second plurality of ring-shaped metal projections includes a fourth ring-shaped metal projection having a fourth outer radius, the first distance is less than a sum of the first outer radius with the second outer radius, the first distance is less than a sum of the second outer radius with the third outer radius, and the first distance is less than a sum of the third outer radius with the fourth outer radius.

13. The heating system according to claim 12, wherein the first transport roller includes a first plurality of protection members, each protection member of the first plurality of protection members being formed in a respective portion of a respective one of the ring-shaped metal projections of the first plurality of ring-shaped metal projections, having a ceramic coating containing a ceramic component, and arranged to contact the heating target.

14. The heating system according to claim 13, wherein the ceramic coating is a ceramic spray coating.

15. The heating system according to claim 13, wherein the ceramic component is zirconia.

16. The heating system according to claim 13, wherein outer peripheral surfaces of the ring-shaped metal projections are rounded.

17. The heating system according to claim 13, wherein the heating target is a surface-treated steel plate containing an aluminum component.

18. The heating system according to claim 13, wherein the first transport roller is configured to transport a metal material as the heating target.

19. The heating system according to claim 13, wherein the first transport roller is configured to transport a heating target that is surface-treated to contain an aluminum component.

20. The heating system according to claim 13, wherein at least one protection member of the first plurality of protection members is formed on a respective side surface of a respective one of the ring-shaped metal projections of the first plurality of ring-shaped metal projections but does not contact the first metal outer tubular member.

21. The heating system according to claim 20, wherein each protection member of the first plurality of protection members is formed on a respective side surface of a respective one of the ring-shaped metal projections of the first plurality of ring-shaped metal projections but does not contact the first metal outer tubular member.

\* \* \* \* \*